United States Patent Office 3,012,054
Patented Dec. 5, 1961

3,012,054
TETRAALKYL ESTERS OF DIPHOSPHONATES
Rodney D. Moss, Midland, Mich., assignor to The Dow Chemical Company, Midland, Mich., a corporation of Delaware
No Drawing. Filed Mar. 18, 1960, Ser. No. 15,840
5 Claims. (Cl. 260—461)

This invention is concerned with organic phosphonates and more particularly with tetraalkyl esters of diphosphonates having the structure

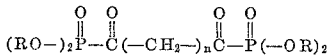

In this and succeeding formulas, R is an alkyl radical containing from 1 to 4 carbon atoms, inclusive, and $n$ is from 2 to 8, inclusive.

The products of the present invention are generally light colored liquids soluble in many organic solvents such as benzene, ethanol, isopropyl alcohol, toluene, xylene and dimethylformamide and are substantially insoluble in water. The compounds are useful as aquatic herbicides and as parasiticides.

The tetraalkyl diphosphonates of the present invention may be prepared by mixing together approximately one molar proportion of a dibasic acid chloride having the formula

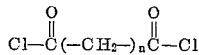

with about two molar proportions of a trialkyl phosphite having the formula $(RO)_3P$, to produce the desired product and an alkyl chloride by-product. The reaction is carried out over a temperature range of from about $-5°$ C. to about $+70°$ C. over a period of from about 5 minutes to 2 hours.

In a preferred method for carrying out the reaction approximately 2 molar proportions of the appropriate trialkyl phosphite is intimately admixed with stirring at a temperature of from about $-5°$ to $10°$ C. with approximately 1 molar proportion of the appropriate dibasic acid halide. After completion of the addition, the reaction mixture is gradually warmed over a period of from about ½ to 2 hours to a temperature of about 70° C. while stirring. As a result of these operations, a reaction takes place with the formation of the desired tetraalkyl diphosphonate and alkyl chloride by-product. The latter is usually a gas or low boiling liquid and is evolved from the reaction mixture although it may remain in the reaction mixture. The product may be isolated from the reaction mixture by heating the mixture under reduced pressure to distill off low boiling by-products and unreacted starting materials and recover the desired product as residue or by fractional distillation of the entire mixture.

The following examples illustrate the present invention but are not to be construed as limiting.

Example 1.—Tetramethyl adipoyldiphosphonate

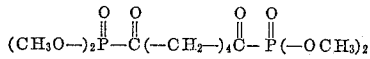

49.6 grams (0.400 mole) of trimethyl phosphite was added with stirring over a half hour period to 36.6 grams (0.200 mole) of adipoyl chloride while the temperature was maintained between 0° and 10° C. Thereafter, the mixture was warmed to a temperature in the range of from about 40° to 50° C. and the stirring was continued for about ½ hour to complete the reaction and to obtain the desired tetramethyl adipoyldiphosphonate product having a refractive index, $n_D^{25°}$ of 1.4642. The yield of the product was 64.5 grams or 98 percent of theoretical The product had a phosphorus content of 19.2 percent; the theoretical value is 18.8 percent. The structure of the product was confirmed by infrared analysis.

Example 2.—Tetraethyl adipoyldiphosphonate 21 grams (0.115 mole) of adipoyl chloride was added with stirring to 55.3 grams (0.345 mole) of triethyl phosphite at a temperature of from about 0° to 10° C. over a period of about 20 minutes. After completion of the addition, the reaction mixture was heated to about 40° to 60° C. and maintained at this temperature for about 1 hour while stirring. The mixture was then heated for about ½ hour in the temperature range of from 50° to 70° C. at 0.1 millimeter of mercury pressure to remove unreacted triethyl phosphite and traces of ethyl chloride by-product. As a result of these operations, there was obtained as residue the desired tetraethyl adipoyldiphosphonate product in a yield of 45 grams or 100 percent of theoretical. The product was an oil having a refractive index, $n_D^{25°}$ of 1.4552. The phosphorus content of the product was 16.66 percent; the theoretical value is 16.47 percent. Infrared analysis confirmed the product to have the structure of tetraethyl adipoyldiphosphonate.

Example 3.—Tetramethyl pimeloyldiphosphonate

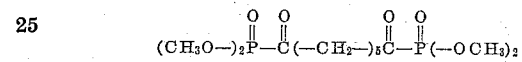

19.7 grams (0.100 mole) of pimeloyl chloride was added with stirring to 37.2 grams (0.300 mole) of trimethyl phosphite at a temperature in the range of from about $-5°$ to $+5°$ C. over a period of about 20 minutes. The stirring was continued at room temperature for about 1 hour and thereafter stirred at a temperature in the range of about 45° to 60° C. for ½ hour. At the end of this period, the excess trimethyl phosphite was distilled off at 50° C. and 1 millimeter of mercury pressure and the desired tetramethyl pimeloyldiphosphonate product obtained as residue. The yield of the product was 30 grams or 87 percent of theoretical. The product had a refractive index, $n_D^{25°}$ of 1.4647 and a phosphorus content of 18.4 percent. The theoretical value for phosphorus is 18.1 percent.

Example 4.—Tetramethyl succinyldiphosphonate 74.4 grams (0.600 mole) of trimethyl phosphite was added with stirring to 31 grams (0.200 mole) of succinyl chloride at a temperature of from about 0° to 10° C. over a period of ½ hour. The reaction mixture was then stirred for ½ hour at 60° to 70° C. and thereafter distilled to obtain a desired tetramethyl succinyldiphosphonate product boiling from 161° to 163° C. at 0.1 millimeter of mercury pressure. The product had elemental analyses as follows:

| | Percent | | |
|---|---|---|---|
| | Phosphorus | Carbon | Hydrogen |
| Found | 19.7 | 32.23 | 5.27 |
| Theory | 20.48 | 31.80 | 5.30 |

Example 5.—Tetra-normal-butyl succinyldiphosphonate

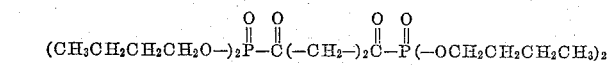

150 grams (0.60) mole) of tri-normal-butyl phosphite is added with stirring at a temperature in the range of from 0° to 10° C. to 31 grams (0.20 mole) of succinyl chloride over a period of about one hour. The reaction mixture is then heated to about 60° C. and the stirring continued for an additional hour. The mixture is then heated to distill off unreacted starting material and butyl chloride by-product and to obtain a tetra-normal-butyl succinyldiphosphonate product having a molecular weight of 406 as residue.

*Example 6.—Tetraisopropyl pimeloyldiphosphonate*

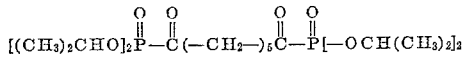

20 grams (0.10 mole) of pimeloyl chloride is added with stirring to 62 grams (0.30 mole) of triisopropyl phosphite at a temperature of from about −5° to +5° C. during a period of about ½ hour. The reaction mixture is stirred at room temperature for about 1 hour and then at about 50° C. for ½ hour. Unreacted triisopropyl phosphite and remaining isopropyl chloride is then removed by reduced pressure distillation to obtain as residue a tetraisopropyl pimeloyldiphosphonate product having a molecular weight of 392.

*Example 7.—Tetramethyl glutaryldiphosphonate*

74 grams (0.60) of trimethyl phosphite is added with stirring to 34 grams (0.20 mole) of glutaryl chloride at a temperature of from about 0° to 10° C. over a period of ½ hour. The reaction mixture is then stirred for an additional ½ hour at a temperature of from about 50° to 70° C. to obtain a tetramethyl glutaryldiphosphonate product. The latter is purified by heating under reduced pressure to remove unreacted starting materials and to recover the product as residue. The product has a molecular weight of 252.

*Example 8.—Tetraethyl succinyldiphosphonate*

100 grams (0.60 mole) of triethyl phosphite is added with stirring to 31 grams (0.20 mole) of succinyl chloride at a temperature of from about 0° to 10° C. over a period of ½ hour. The reaction mixture is then heated to about 60° C. and the stirring continued for an additional half hour. At the end of this period, the mixture is heated under reduced pressure to vaporize unreacted starting material traces of ethyl chloride by-product to obtain a tetraethyl succinyldiphosphonate product as residue. The product has a molar weight of 294.

*Example 9.—Tetraisobutyl suberoyldiphosphonate*

15 grams (0.06 mole) of triisobutyl phosphite is added with stirring to 4.2 grams (0.02 mole) of suberoyl chloride at a temperature of from 0° to 10° C. over a period of about ½ hour. The reaction mixture is then heated to about 60° C. and stirred for an additional half hour. At the end of this period, the mixture is heated under reduced pressure to distill off unreacted triisobutyl phosphite and isobutyl chloride by-product and to obtain as residue a tetraisobutyl suberoyldiphosphonate product having a molecular weight of 472.

*Example 10.—Tetra-normal-propyl glutaryldiphosphonate*

12.5 grams (0.060 mole) of tri-normal-propyl phosphite is added with stirring to 3.4 grams (0.020 mole) of glutaryl chloride. The addition is carried out at a temperature in the range of from about 0° to 10° C. over a period of ½ hour. The reaction mixture is then heated to a temperature in the range of from about 50° to 70° C. and stirred at this temperature for an additional half hour. At the end of this period, the mixture is heated under reduced pressure to distill off reacted tri-normal-propyl phosphite and normal-propyl chloride by-product and to obtain as residue a tetra-normal-propyl glutaryldiphosphonate product having a molecular weight of 364.

*Example 11*

In similar preparations, the following compounds are prepared:

Tetraethyl glutaryldiphosphonate by the reaction of triethyl phosphite and glutaryl chloride.
Tetraethyl pimeloyldiphosphonate by the reaction of triethyl phosphite and pimeloyl chloride.
Tetramethyl azelaoyldiphosphonate by the reaction of trimethyl phosphite and azelaoyl chloride.
Tetramethyl sebacoyldiphosphonate by the reaction of trimethyl phosphite and sebacoyl chloride.
Tetraethyl sebacoyldiphosphonate by the reaction of triethyl phosphite and sebacoyl chloride.
Tetraisopropyl azelaoyldiphosphonate by the reaction of triisopropyl phosphite and azelaoyl chloride.
Tetramethyl glutaryldiphosphonate by the reaction of trimethyl phosphite and glutaryl chloride.
Tetra-normal-butyl adipoyldiphosphonate by the reaction of tri-normal-butyl phosphite and adipoyl chloride.
Tetramethyl suberyldiphosphonate by the reaction of trimethyl phosphite and suberyl chloride.
Tetraethyl suberyldiphosphonate by the reaction of triethyl phosphite and suberyl chloride.
Tetra-normal-propyl azelaoyldiphosphonate by the reaction of tri-normal-propyl phosphite and azelaoyl chloride.
Tetraisopropyl sebacoyldiphosphonate by the reaction of triisopropyl phosphite and sebacoyl chloride.

The organic phosphonates of the present invention are useful as aquatic herbicides for the control of submersed and floating aquatic weeds. In its use as aquatic herbicides, it was found that good controls of water weed, coon tail, fanwort and moneywort were obtained when in separate operations these submersed and floating weeds were exposed for several hours to tanks containing tetramethyl pimeloyldiphosphonate, tetramethyl succinyldiphosphonate and tetramethyl adipoyldiphosphonate.

The products of the present invention are further useful as parasiticides particularly for the control of aphids, bacteria, fungi and helminths.

The compounds are also useful fire retardants.

I claim:

1. A phosphonate having the structure

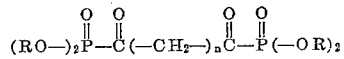

wherein R is a lower alkyl radical containing from 1 to 4 carbon atoms, inclusive, and $n$ is an integer of from 2 to 8, inclusive.
2. Tetramethyl adipoyldiphosphonate.
3. Ttetraethyl adipoyldiphosphonate.
4. Tetramethyl pimeloyldiphosphonate.
5. Tetramethyl succinyldiphosphonate.

References Cited in the file of this patent

UNITED STATES PATENTS

| | | |
|---|---|---|
| 2,491,920 | Ernsberger | Dec. 20, 1949 |
| 2,629,731 | Harman | Feb. 24, 1953 |
| 2,900,408 | Blaser et al. | Aug. 18, 1959 |